United States Patent
Kumachi et al.

(10) Patent No.: US 11,135,035 B2
(45) Date of Patent: Oct. 5, 2021

(54) DENTAL HAND PIECE AND METHOD FOR MANUFACTURING DENTAL HAND PIECE

(71) Applicant: THE YOSHIDA DENTAL MFG. CO., LTD., Tokyo (JP)

(72) Inventors: Satoru Kumachi, Tokyo (JP); Mari Ito, Tokyo (JP)

(73) Assignee: THE YOSHIDA DENTAL MFG. CO., LTD., Tokyo (JP)

( * ) Notice: Subject to any disclaimer, the term of this patent is extended or adjusted under 35 U.S.C. 154(b) by 134 days.

(21) Appl. No.: 16/316,576

(22) PCT Filed: Apr. 21, 2017

(86) PCT No.: PCT/JP2017/016102
§ 371 (c)(1),
(2) Date: Jan. 9, 2019

(87) PCT Pub. No.: WO2018/012079
PCT Pub. Date: Jan. 18, 2018

(65) Prior Publication Data
US 2019/0290394 A1 Sep. 26, 2019

(30) Foreign Application Priority Data
Jul. 13, 2016 (JP) .............................. JP2016-138940

(51) Int. Cl.
*A61C 1/12* (2006.01)
*A61C 1/08* (2006.01)

(52) U.S. Cl.
CPC . *A61C 1/12* (2013.01); *A61C 1/08* (2013.01)

(58) Field of Classification Search
CPC .................................... A61C 1/08; A61C 1/12
See application file for complete search history.

(56) References Cited

U.S. PATENT DOCUMENTS 3,955,284 A * 5/1976 Balson ..................... A61C 1/05
433/132
4,735,200 A * 4/1988 Westerman ........ A61C 17/0202
15/22.2
(Continued)

FOREIGN PATENT DOCUMENTS

CN 1306804 A 8/2001
CN 1722992 A 1/2006
(Continued)

OTHER PUBLICATIONS

European Supplemental Search Report issued in corresponding European patent application No. EP17827213.4, dated Feb. 20, 2020. (7 pp).
(Continued)

*Primary Examiner* — Ralph A Lewis
(74) *Attorney, Agent, or Firm* — Day Pitney LLP; Valeriya Svystun

(57) ABSTRACT

A dental hand piece has: a hand piece head provided at the front end section thereof; and a connection section provided at the rear end section thereof, and the dental hand piece is used by connecting the connection section to a dental unit. The dental hand piece is provided with: a plurality of metallic pipes for providing communication between the hand piece head and the connection section; and an elastic resin member mounted so as to cover a portion extending at least from the rear end section of the hand piece head to the front end section of the connection section. The outer peripheries of the metallic pipes are embedded within the elastic resin member so as to be in close contact with the inside thereof.

11 Claims, 7 Drawing Sheets

(56) References Cited

U.S. PATENT DOCUMENTS

| | | | | |
|---|---|---|---|---|
| 4,921,424 | A | * | 5/1990 | Kimura .................. A61C 1/05 |
| | | | | 433/114 |
| 5,252,067 | A | * | 10/1993 | Kakimoto ................ A61C 1/14 |
| | | | | 433/126 |
| 5,797,743 | A | | 8/1998 | Bailey |
| 2003/0091953 | A1 | * | 5/2003 | Cheney ................. A61C 1/088 |
| | | | | 433/29 |
| 2004/0126737 | A1 | | 7/2004 | Atkin et al. |
| 2005/0221256 | A1 | | 10/2005 | Kangasniemi |
| 2008/0057471 | A1 | | 3/2008 | Atkin et al. |
| 2011/0177473 | A1 | * | 7/2011 | Darwish ................. A61C 1/12 |
| | | | | 433/117 |
| 2012/0301841 | A1 | * | 11/2012 | Garcia ................... A61C 1/08 |
| | | | | 433/29 |

FOREIGN PATENT DOCUMENTS

| | | |
|---|---|---|
| EP | 1 025 809 A2 | 8/2000 |
| JP | S64-062151 A | 3/1989 |
| JP | H07-60835 A | 3/1995 |
| JP | 2000-508951 A | 7/2000 |
| JP | 2005-531379 A | 10/2005 |

OTHER PUBLICATIONS

International Search Report issued in corresponding international application No. PCT/JP2017/016102, dated Jul. 18, 2017 (with English language translation).
Notification of Reasons for Refusal issued in corresponding Japanese patent application No. JP 2016-138940, dated Jul. 29, 2018 (with English language translation).
Written Opinion issued in corresponding international application No. PCT/JP2017/016102, dated Jul. 18, 2017 (English language translation unavailable.
First Office Action in related Chinese App. No. 201780040863.3 and English translation thereof, dated Jul. 2, 2020.

* cited by examiner

DENTAL HAND PIECE AND METHOD FOR MANUFACTURING DENTAL HAND PIECE

CROSS-REFERENCE TO RELATED APPLICATIONS

This application is a U.S. National Stage Application under 35 U.S.C. § 371 of International Application No. PCT/JP2017/016102, filed on 21 Apr. 2017, and published on 18 Jan. 2018, as WO 2018/012079 A1, which claims the benefit of priority to Japanese Patent Application No. JP 2016-138940, filed on 13 Jul. 2016. The content of each of the above referenced patent applications is incorporated herein by reference in its entirety for any purpose whatsoever.

TECHNICAL FIELD

The present invention relates to a dental hand piece and a method for manufacturing a dental hand piece, and particularly to a dental hand piece in which metallic pipes are arranged inside an elastic resin member and a method for manufacturing the dental hand piece.

BACKGROUND ART

A dental hand piece has heretofore been known which includes a synthetic resin grip section and a synthetic resin liquid passage tube for reducing the weight of the dental hand piece (see, for example, Japanese Unexamined Patent Application Publication No. 64-62151 (Claim 1, the lower left column on page 3 to the upper left column on page 4, and FIG. 2 and FIG. 4) ("Patent Literature 1")).

The synthetic resin grip section described in Patent Literature 1 has, in a front end, a coupling section which includes a coupling hole into which a coupling pipe with an O-ring of a detachable head section is fitted, and the coupling section is attached to and detached from the detachable head section. This configuration allows for a structure that does not have to be provided with a metallic connector. The synthetic resin grip section has a tubular shape through which the synthetic resin liquid passage tube is arranged to penetrate.

SUMMARY OF INVENTION

Technical Problem

However, in the dental hand piece described in Patent Literature 1, since the detachable head section has a complicated structure, there is a problem that the number of manufacturing steps is increased. In addition, since the coupling section is attached to and detached from the detachable head section, there is a problem that it is difficult to provide sufficient air-tightness to the detachable head section.

In view of this, it is an object of the present invention to provide a dental hand piece and a method for manufacturing a dental hand piece, capable of enhancing air-tightness in an elastic resin member and also reducing the number of manufacturing steps while achieving a reduction in weight.

Solution to Problem

To achieve the above-described object, a dental hand piece according to the present invention is a dental hand piece having a hand piece head provided at a front end section thereof and a connection section provided at a rear end section thereof, which is used with the connection section being connected to a dental unit, the dental hand piece including: a plurality of metallic pipes through which the hand piece head and the connection section communicate with each other; and an elastic resin member mounted so as to cover a portion extending at least from a rear end section of the hand piece head to a front end section of the connection section, wherein outer peripheral sections of the metallic pipes are embedded within the elastic resin member so as to be in close contact with the elastic resin member.

According to the above configuration, since the outer peripheral sections of the metallic pipes of the dental hand piece are arranged inside the elastic resin member such that the outer peripheral sections are embedded in close contact with the elastic resin member, the elastic resin member covers the outer peripheral sections of the metallic pipes with no gap, which makes it possible to enhance the air-tightness. In particular, the elastic resin member, covering the rear end section of the connection section, makes it possible to prevent drugs, bacteria, dust, and the like from entering the components.

Moreover, since the grip section of the dental hand piece from the rear end section of the hand piece head to the front end section of the connection section is formed of the elastic resin member, it is possible to reduce the weight of the dental hand piece as compared with a metallic one. Thus, it is possible to improve the operability and also not to make a user tired even the user uses the dental hand piece for a long time.

In addition, since the grip section made of an elastic resin member has a lower thermal conductivity than a metallic one, the dental hand piece can be used immediately after sterilization treatment. Moreover, since the grip section is more elastic than metal, it is possible to reduce discomfort when the grip section comes into contact with a tooth of a patient.

Moreover, it is preferable that the connection section be formed of a metallic member, the metallic pipe be provided in such a manner as to penetrate through the connection section and be projected out of a rear end section of the connection section, the connection section include a communication hole which penetrates from the front end section to the rear end section of the connection section, the elastic resin member include: a body covering section which is attached to cover the portion from the rear end section of the hand piece head to the front end section of the connection section; a sealing section which is attached to cover the rear end section of the connection section; and a communicating section through which the body covering section and the sealing section communicate with each other, and the communicating section be arranged inside the communication hole.

According the above configuration, since in the connection section of the dental hand piece, the metallic pipes penetrate the connection section and are projected out, it is possible to firmly fix the metallic pipes to the connection section.

Moreover, since in the elastic resin member of the dental hand piece, the communicating section through which the body covering section and the sealing section communicate with each other is arranged inside the communication hole, it is possible to couple the body covering section and the sealing section to firmly fix these to the connection of the dental hand piece.

Moreover, it is preferable that a recess section be formed in an outer peripheral section of the connection section, and the body covering section be arranged and attached inside the recess section.

According to the above configuration, since the body covering section is arranged and attached inside the recess section of the connection section, it is possible to firmly couple the elastic resin member to the connection section and to prevent the elastic resin member from being displaced in an axial direction.

Moreover, it is preferable that the elastic resin member be of a colored thermosetting resin.

According to the above configuration, since the elastic resin member is of a colored thermosetting resin, it is possible to color the grip section of the dental hand piece with the user's preferred color. It is also possible to color the dental hand piece with different colors depending on its type or with the same color as the main body.

Moreover, it is preferable that the colored thermosetting resin be silicone resin.

According to the above configuration, since the thermosetting resin of the elastic resin member is silicone resin, the user can grip the dental hand piece with soft feeling to touch. In addition, it is possible to reduce impact when the section made of silicone resin comes into contact with a tooth of a patient or drops.

Moreover, a method for manufacturing a dental hand piece according to the present invention is a method for manufacturing a dental hand piece, the dental hand piece having a hand piece head provided in a front end section, a connection section provided in a rear end section, and a metallic pipe through which the hand piece head and the connection section communicate with each other, the method comprising: molding an elastic resin member to cover at least a portion from the rear end section of the hand piece head to a front end section of the connection section by resin-molding to arrange the metallic pipe inside the elastic resin member such that the metallic pipe is embedded in close contact with the elastic resin member.

According to the above configuration, since from the rear end section of the hand piece head to the front end section of the connection section, the elastic resin member is molded and the metallic pipe is arranged inside, the method for manufacturing a dental hand piece makes it possible to reduce the weight and enhance the air-tightness with the elastic resin member.

Moreover, in the dental hand piece manufactured by the above-describe manufacturing method, since the elastic resin member is molded from the rear end section of the hand piece head to the front end section of the connection section, it is possible to form a resin grip section inside which the metallic pipe is arranged in such a manner as to be embedded in close contact with the rear end section of the hand piece head and the front end section of the connection section with no gap.

Furthermore, it is preferable that the connection section be formed of a metallic member, the metallic pipe be provided in such a manner as to penetrate the connection section and be projected out of a rear end section of the connection section, the connection section include a communication hole which penetrates from the front end section to the rear end section of the connection section, the elastic resin member molded include: a body covering section which is attached to cover the portion from the rear end section of the hand piece head to the front end section of the connection section; a sealing section which is attached to cover the rear end section of the connection section; and a communicating section through which the body covering section and the sealing section communicate with each other, and the communicating section be arranged inside the communication hole.

According to the above configuration, since the elastic resin member has the body covering section which is attached to cover the portion from the rear end section of the hand piece head to the front end section of the connection section, the grip section can be made of an elastic resin and thus can be made soft to touch. In addition, since the grip section is made of an elastic resin member, it is possible to reduce impact when the grip section comes into contact with a tooth of a patient or drops.

Moreover, in the elastic resin member, since the communicating section is arranged inside the communication hole of the connection section, it is possible to firmly attach the elastic resin member to the connection section.

Advantageous Effects of Invention

The present invention makes it possible to provide a dental hand piece and a method for manufacturing a dental hand piece, capable of enhancing air-tightness in an elastic resin member and also reducing the number of manufacturing steps while achieving a reduction in weight.

DESCRIPTION OF EMBODIMENTS

First, a dental hand piece and a method for manufacturing a dental hand piece according to an embodiment of the present invention will be described with reference to FIG. 1 to FIG. 3.

Note that in the present embodiment, in a dental hand piece 1 illustrated in FIG. 1, the hand piece head 2 side and the connection section 3 side are referred respectively to as a forward direction and a backward direction, and description will be given while the forward direction is indicated by "F"; the backward direction, "B"; the vertically upper side, "U"; the vertically lower side, "D"; the left side, "L"; and the right side, "R", as appropriate. In addition, the same applies to each component.

<Dental Hand Piece>

Figure 1:
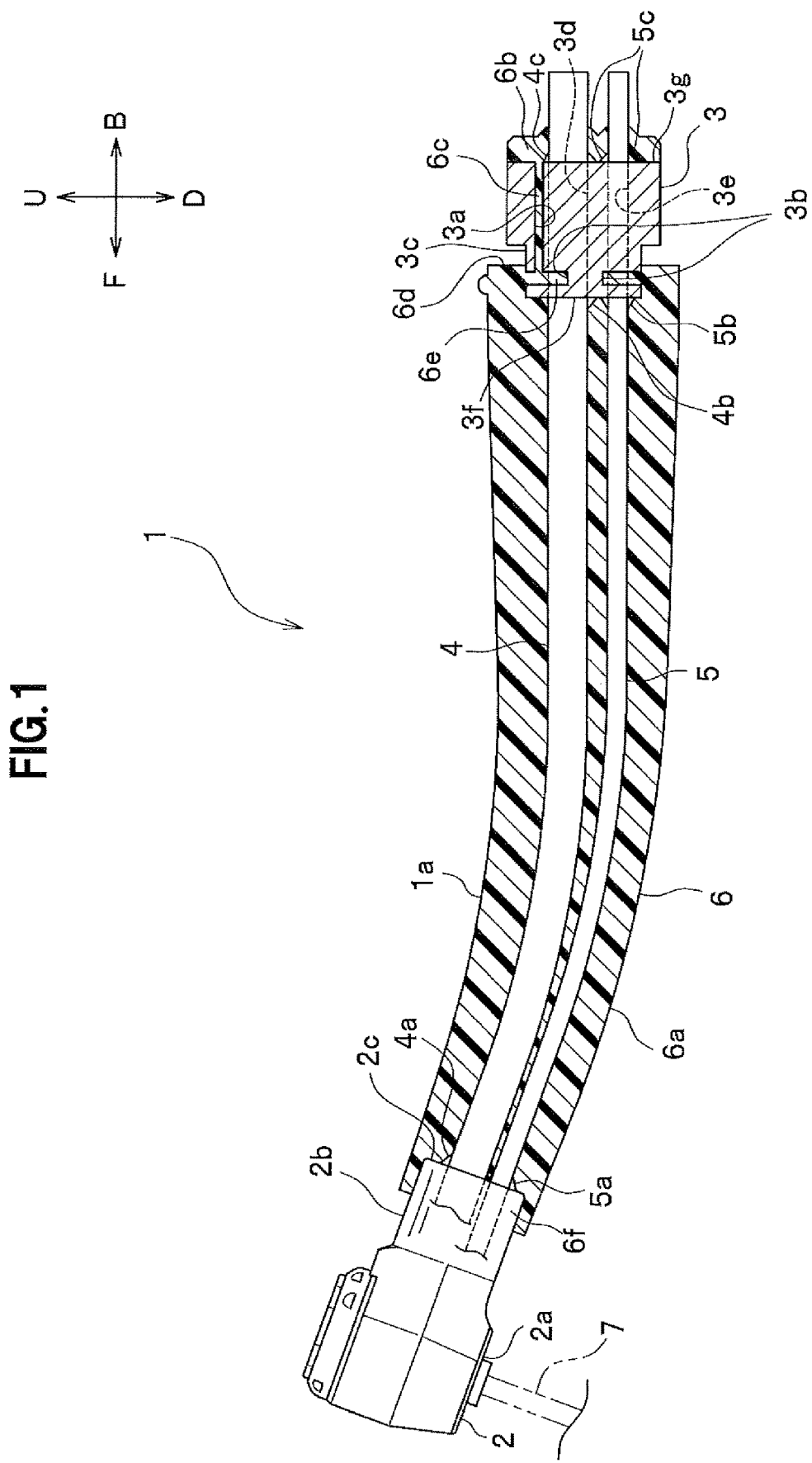
FIG. 1 is a side view having a partial cross-section illustrating a dental hand piece according to an embodiment of the present invention.

The dental hand piece 1 illustrated in FIG. 1 is a medical instrument used for dental treatment. The dental hand piece 1 includes: a hand piece head 2 which is provided in a front end section; a connection section 3 which is provided in a rear end section; a plurality of metallic pipes 4, 5 through which the hand piece head 2 and the connection section 3 communicate with each other; and an elastic resin member 6 which covers a grip section 1a. When the dental hand piece 1 is used, the connection section 3 is connected to a dental unit (not illustrated) and a desired cutting tool 7 is attached to the hand piece head 2.

Note that the dental hand piece 1 is not particularly limited in terms of function, structure, type, and the like as long the the dental hand piece 1 includes the hand piece head 2, the connection section 3, the plurality of metallic pipes 4, 5, and the elastic resin member 6 as mentioned above. In other words, the dental hand piece 1 includes various types, and may be one that incorporates a motor (not illustrated) which is driven by electric power supplied from a built-in battery or an external power source or may be one that incorporates no motor. Alternatively, the dental hand piece 1 may be a dental scaler in which a dental tip is provided on a hand piece head 2B (see FIG. 5 to FIG. 6) and is ultrasonically vibrated by electric power or one that is driven by power other than electric power. Hereinafter, the dental hand piece 1 that incorporates a rotor (not illustrated) in the hand piece head 2 will be described as an example.

<Hand Piece Head>

The hand piece head 2 is a portion to which the cutting tool 7 is detachably attached. The hand piece head 2 is a substantially cylindrical member provided on a front end of the grip section 1a of the dental hand piece 1. The hand piece head 2 and the connection section 3 are each formed of a metal such as stainless steel. The hand piece head 2 is provided with: an opening hole 2a formed on a lower side for attaching and detaching the cutting tool 7; a neck section 2b to which the grip section 1a is coupled; the rotor (not illustrated) for driving the cutting tool 7 to rotate; and the like.

Inside the neck section 2b, insertion holes (not illustrated) are formed into which front end sections of the metallic pipes 4, 5 are inserted. The elastic resin member 6 is resin-molded to cover an outer peripheral section of a rear end section of the neck section 2b.

The dental hand piece 1, which is of the type that incorporates the rotor (not illustrated), is configured to cut a tooth by rotating the rotor (not illustrated) inside the hand piece head 2 at a high speed with compressed air to rotate the cutting tool 7 mounted on the rotor shaft at a high speed.

<Cutting Tool>

The cutting tool 7 has a known structure having: a stem section to be attached to the opening hole 2a of the hand piece head 2; and a tapered needle section provided to project out of the opening hole 2a.

<Connection Section>

The connection section 3 is formed of a substantially tubular member attached integrally to a rear end section of the elastic resin member 6. The connection section 3 has: communication holes 3a formed to penetrate in an axial direction; a recess section 3b formed annularly at a position close to a front end section; a step section 3c adjacent to a body covering section rear end face 6d; and pipe insertion holes 3d, 3e through which the metallic pipes 4, 5 are inserted.

The communication holes 3a are through-holes that allow a resin material which forms a body covering section 6a to flow from inside the communication holes 3a to a sealing section 6b and form a communicating section 6c and the sealing section 6b such that the body covering section 6a and the sealing section 6b are continuous to each other during the molding of the grip section 1a. The resin material provided inside the communication holes 3a is formed from inside the recess section 3b to a rear end face 3g of the connection section 3 along the axial direction and connects the resin material of the body covering section 6a and the resin material of the sealing section 6b. The communication holes 3a are formed at four positions on the upper, lower, left, and right sides when the connection section 3 is viewed in the forward and backward directions.

The recess section 3b is a section that allows the resin material which forms the body covering section 6a to flow into the recess section 3b, firmly fixing the elastic resin member 6 to the connection section 3, during the molding of the grip section 1a.

The step section 3c is a section formed stepwise at a lower level than an outer peripheral surface of the communication holes 3a toward the axial center. This step section 3c and the body covering section rear end face 6d form an annular groove recessed in a vertical cross-sectional view.

The pipe insertion holes 3d, 3e are through-holes through which the metallic pipes 4, 5 are inserted to be provided while being projected backward out of the connection section 3.

<Metallic Pipes>

The metallic pipes 4, 5 are a plurality of tubular members provided from the hand piece head 2 across the connection section 3. The metallic pipes 4, 5 form passages through which compressed air for rotor or the like is supplied and discharged or through which water or air is supplied as in the case of conventional pipes. The metallic pipes 4, 5 include four metallic pipes, for example; however, the number of the metallic pipes 4, 5 is not particularly limited.

Figure 3:
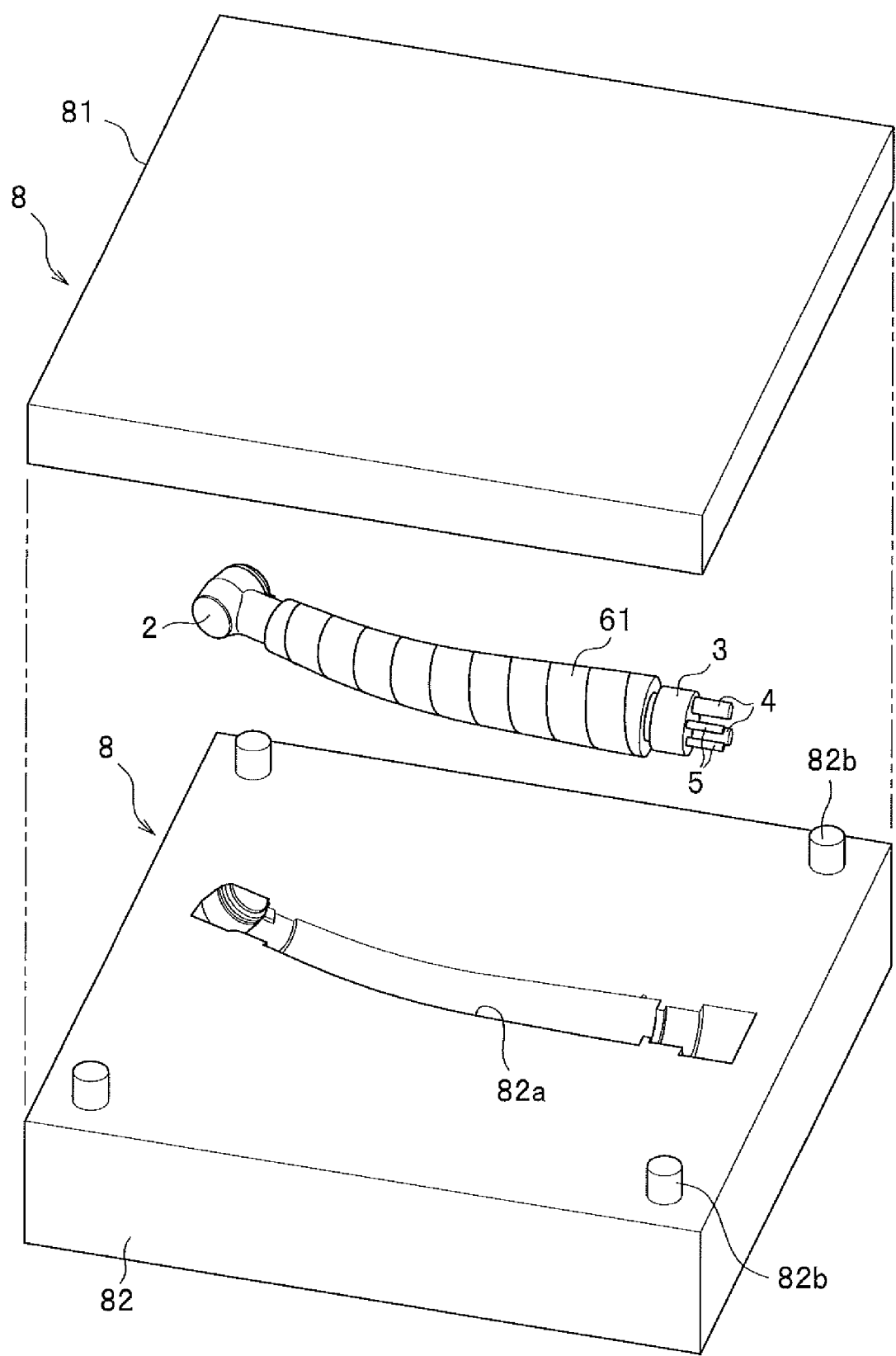
FIG. 3 is a step view illustrating a molding step of the method for manufacturing a dental hand piece.

In this case, as illustrated in FIG. 3, the metallic pipe 4 includes two pipes, namely, a pipe for supplying compressed air used to rotate the rotor (not illustrated) and a pipe for discharging the compressed air. These two metallic pipes 4 are provided at the left and right sides of a substantially center portion in the vertical cross-sectional view in the connection section 3 and the elastic resin member 6.

Moreover, the metallic pipe 5 includes two pipes, namely, a water supply pipe for supplying water and a tip-air supply pipe for supplying air to generate mist together with the water. To put it differently, these two metallic pipes 5 are used to enhance the work efficiency by cooling down the cutting tool 7 or to blow off foreign matter and the like for the purpose of making it easy to visually check an affected site smeared with blood or the like during treatment, and the like. The metallic pipes 5 are formed smaller in diameter than the metallic pipes 4. These two metallic pipes 5 are provided at the left and right sides on a lower side of the center portion in the vertical cross-sectional view in the connection section 3 and the elastic resin member 6.

As illustrated in FIG. 1, in the grip section 1a, the outer peripheral sections of the metallic pipes 4, 5 are arranged inside the elastic resin member 6 such that the outer peripheral sections are embedded in close contact with the elastic resin member 6. For this reason, the metallic pipes 4, 5 play a role of frame members in the grip section 1a. The front end sections of the metallic pipes 4, 5 are inserted in the hand piece head 2 from a rear end face 2c of the neck section 2b. The metallic pipes 4, 5 have, at the front end sections, front joint sections 4a, 5a for joining the metallic pipes 4, 5 with the rear end face 2c of the hand piece head 2 by brazing or the like. The rear end sections of the metallic pipes 4, 5 are provided in such a manner as to penetrate through the connection section 3 and be projected out of the rear end section of the connection section 3. The metallic pipes 4, 5 have, at the rear end sections, rear joint sections 4b, 5b for joining the metallic pipes 4, 5 with the front end face 3f of the connection section 3 by brazing or the like and rear joint sections 4c, 5c for joining the metallic pipes 4, 5 with the rear end face 3g of the connection section 3 by brazing or the like.

<Elastic Resin Member>

The elastic resin member 6 is attached to cover at least a portion from the rear end section of the hand piece head 2 through the metallic pipes 4, 5 to the front end section of the connection section 3. The elastic resin member 6 includes: the body covering section 6a which forms the grip section 1a; the sealing section 6b which is attached to cover the rear end section of the connection section 3; the communicating section 6c through which the body covering section 6a and the sealing section 6b communicate with each other; the body covering section rear end face 6d which is provided to face a side wall of the step section 3c; a locking section 6e which is provided inside the recess section 3b; and a head rear end section covering section 6f which covers the rear end section of the neck section 2b.

The elastic resin member 6 is made of a thermosetting resin which has lighter in weight than a metal and has flexibility and elasticity. Moreover, the elastic resin member 6 is specifically made of a colored synthetic resin obtained by coloring a colorless silicone resin with a desired color. As illustrated in FIG. 3, the elastic resin member 6 is formed by placing a wound resin member 61 having a tape shape (or a sheet shape) and being wound around the metallic pipes 4, 5, in a mold 8 heated to a high temperature, and then, the wound resin member 61 is melt and molded into the grip section 1a.

As illustrated in FIG. 1, the grip section 1a is a section that a user grips and operates with his/her hand. The grip section 1a is formed in a substantially circular shape by the body covering section 6a, which incorporates the metallic pipes 4, 5.

The body covering section 6a is a section that is attached to cover a portion from the rear end section of the hand piece head 2 to the front end section of the connection section 3. The body covering section 6a is formed to be curved in an arch shape in a side view.

The sealing section 6b is a section that plays a role of a packing interposed between the connection section 3 and the dental unit (not illustrated) connected to the connection section 3 when the connection section 3 is connected to the dental unit (not illustrated). The sealing section 6b is provided to cover the entire rear end face 3g of the connection section 3.

The communicating section 6c is a resin material filled in the communication holes 3a of the connection section 3. The communicating section 6c is formed to connect the body covering section 6a and the sealing section 6b.

The body covering section rear end face 6d is arranged to form a recessed groove together with the step section 3c and is formed in a shape that allows burrs formed on the body covering section rear end face 6d to be easily removed during the resin molding.

The locking section 6e is a resin material filled and formed in the annular recess section 3b. The locking section 6e and the communicating section 6c function to prevent the elastic resin member 6 from being peeled off from the connection section 3.

The head rear end section covering section 6f is a section that covers the rear end face 2c of the neck section 2b and the peripheral edge portion of the rear end face 2c. The head rear end section covering section 6f thus configured is formed to be in close contact with the rear end face 2c of the neck section 2b to play a role of suppressing movement of the elastic resin member 6 toward the hand piece head 2.

As illustrated in FIG. 3, the wound resin member 61 is a resin material of the grip section 1a of the elastic resin member 6 (see FIG. 1), which is molded with the mold 8, before the molding. The wound resin member 61 is of a tape shape (a strip shape) formed in a desired thickness, and is wound around the outer periphery of the metallic pipes 4, 5 between the hand piece head 2 and the connection section 3 in the same volume as that of the elastic resin member 6 formed into the grip section 1a.

<Operation>

Next, the operations of the dental hand piece and the method for manufacturing a dental hand piece according to the present embodiment will be described along the manufacturing steps with reference to FIG. 1 to FIG. 3.

Figure 2A:
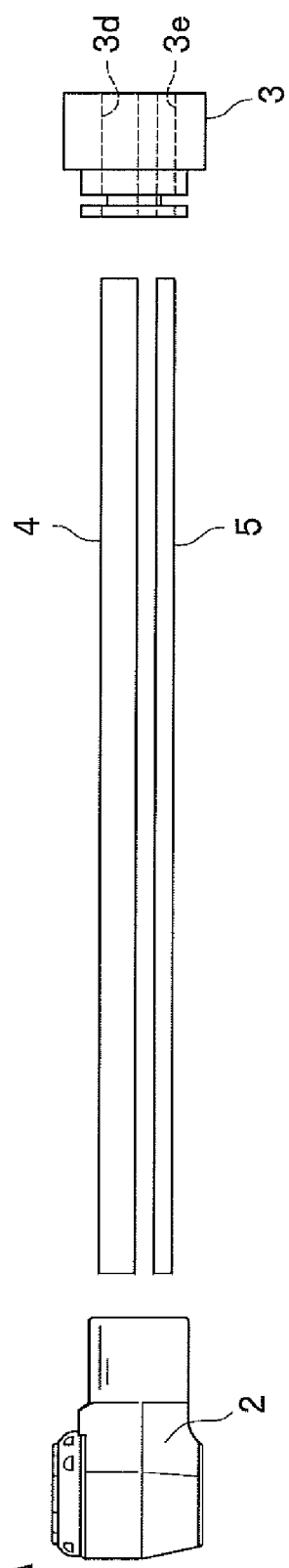
FIGS. 2A to 2C are step views illustrating a method for manufacturing a dental hand piece according to the embodiment of the present invention.

First, as illustrated in FIG. 2A, the hand piece head 2, the connection section 3, and the four metallic pipes 4, 5 described above are each manufactured and prepared (preparation step).

Next, the front end sections of the respective metallic pipes 4, 5 are inserted into the insertion holes (not illustrated) of the hand piece head 2, and the rear end sections of the respective metallic pipes 4, 5 are inserted through the respective pipe insertion holes 3d, 3e of the connection section 3 (metallic pipe insertion step).

Figure 2B:
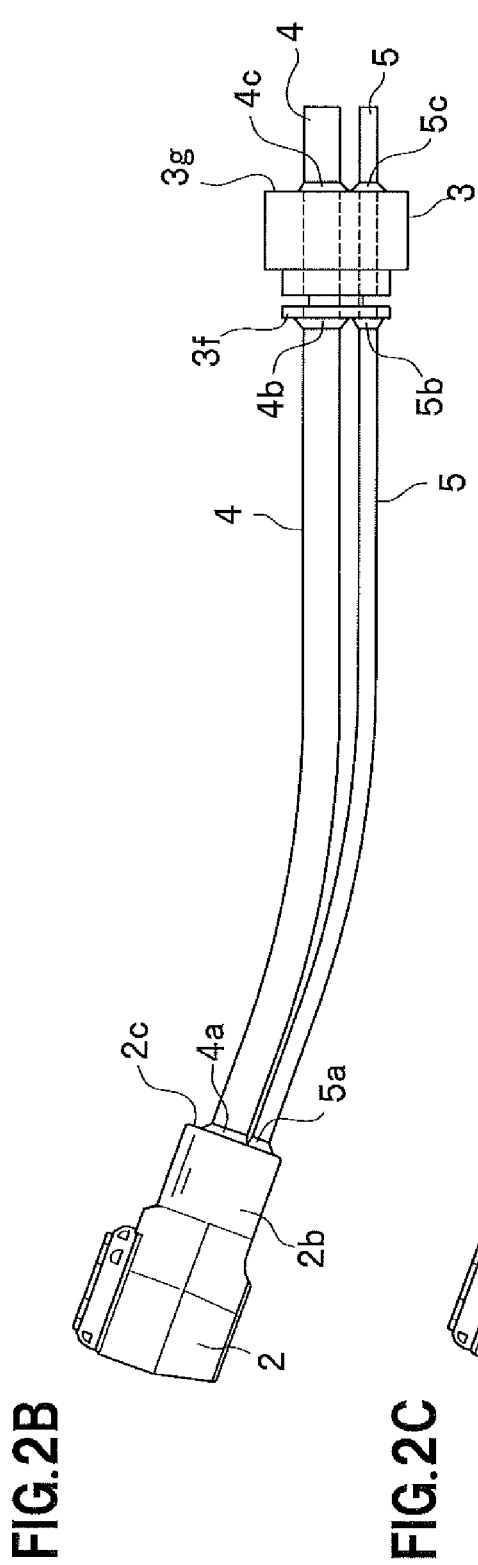

Subsequently, as illustrated in FIG. 2B, the front joint sections 4a, 5a of the respective metallic pipes 4, 5 are brazed and joined to the rear end face 2c of the hand piece head 2, and the rear joint sections 4b, 4c, 5b, 5c of the metallic pipes 4, 5 are brazed and joined to the front end face 3f and the rear end face 3g of the connection section 3 (brazing step). In this way, the metallic pipes 4, 5 can be fixed to the hand piece head 2 and the connection section 3.

In this case, since the connection section 3 of the dental hand piece 1 is such that since the metallic pipes 4, 5 penetrate the connection section 3 to be projected out of the connection section 3, the metallic pipes 4, 5 can be firmly fixed to the connection section 3.

Figure 2C:
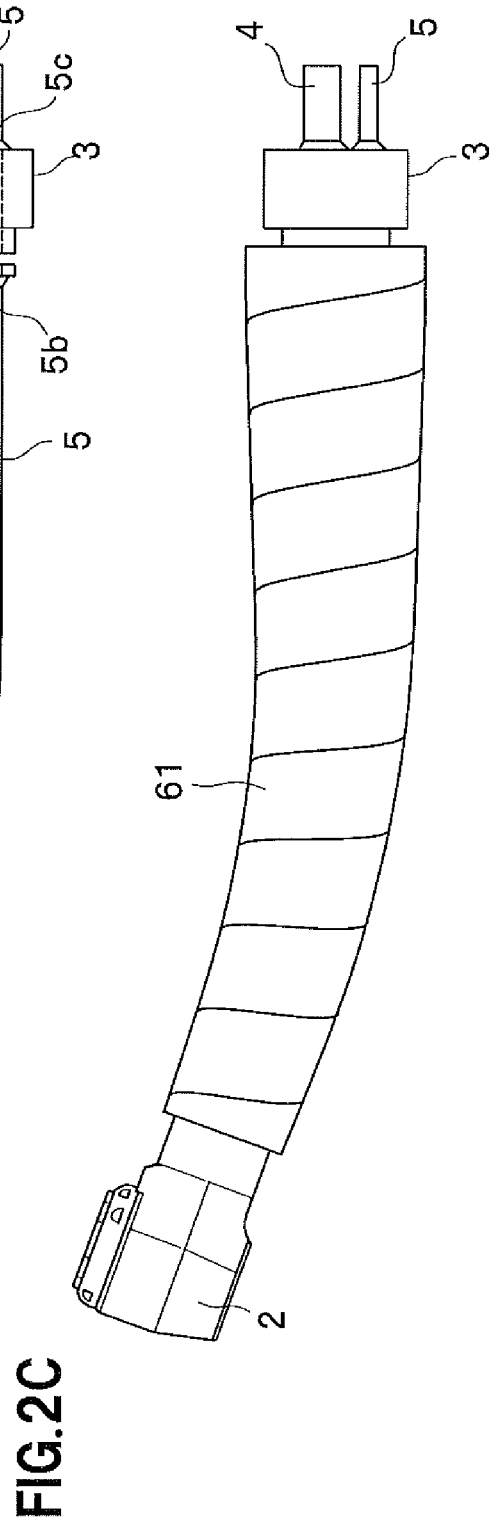

Next, as illustrated in FIG. 2C, the wound resin member 61 is wound from the rear end section of the hand piece head 2 to the front end section of the connection section 3 (wound resin member winding step).

Thereafter, before the dental hand piece 1 is molded with the mold 8 illustrated in FIG. 3, the wound resin member 61 is melted and heated to a suitable temperature, which is suitable for molding the grip section 1a, with an upper mold half 81 and a lower mold half 82 (heating step).

Subsequently, the uncompleted dental hand piece 1 in which the wound resin member 61 has been wound is pressed and set into a mold groove of the lower mold half 82 (mold setting step).

Next, positioning holes (not illustrated) of the upper mold half 81 are fitted to positioning protrusions 82b of the lower mold half 82 to compress the uncompleted dental hand piece 1 between the lower mold half 82 and the upper mold half 81. The wound resin member 61 of the uncompleted dental hand piece 1 is compressed by the lower mold half 82 and upper mold half 81 heated to a high temperature to be melted and molded into the grip section 1a made of the elastic resin member 6 illustrated in FIG. 1 (molding step).

In this way, the dental hand piece 1 is completed.

Since the dental hand piece 1 is molded as described above, the outer peripheral sections of the respective metallic pipes 4, 5 are arranged inside the elastic resin member 6 such that the outer peripheral sections are embedded in close contact with the elastic resin member 6. Accordingly, it is possible enhance the air-tightness by covering the outer peripheral sections with no gap between the outer peripheral sections and the elastic resin member 6.

Moreover, since the elastic resin member 6 is provided in close contact with the hand piece head 2, the connection section 3, and the metallic pipes 4, 5 with no gap, it is possible to prevent drugs, bacteria, dust, and the like from entering these components.

Moreover, since the elastic resin member 6 of the dental hand piece 1 is such that the communicating section 6c through which the body covering section 6a and the sealing section 6b communicate with each other is arranged inside the communication holes 3a, it is possible to couple the body covering section 6a and the sealing section 6b and firmly fix the elastic resin member 6 to the connection section 3.

Furthermore, since the elastic resin member 6 is attached with the body covering section 6a arranged inside the recess section 3b of the connection section 3, it is possible to firmly couple the elastic resin member 6 to the connection section 3 and to thus prevent the elastic resin member 6 from being displaced in the axial direction.

The dental hand piece 1 formed as described above makes it possible to treat a tooth of a patient with the cutting tool 7 attached to the hand piece head 2 and air supplied to drive the rotor (not illustrated) to rotate, which in turn rotates the cutting tool 7.

Moreover, since the dental hand piece 1 is formed such that the elastic resin member 6 covers the grip section 1a from the rear end section of the hand piece head 2 to the front end section of the connection section 3, it is possible to reduce the weight of the dental hand piece 1 as compared with a metallic hand piece. Thus, it is possible to improve the operability and also not to make the user tired even when the user uses the dental hand piece 1 for a long time.

The method for manufacturing the dental hand piece 1 is capable of forming the grip section 1a of an elastic resin in which the metallic pipes 4, 5 are arranged such that the metallic pipes 4, 5 are embedded in close contact with the rear end section of the hand piece head 2 and the front end section of the connection section 3 with no gap by molding the elastic resin member 6 from the rear end section of the hand piece head 2 to the front end section of the connection section 3 such that the metallic pipes 4, 5 are arranged inside. For this reason, it is possible to make the grip section 1a soft to touch.

Moreover, since the dental hand piece 1 has a lower thermal conductivity than a metallic hand piece, the dental hand piece 1 can be used immediately after sterilization treatment. Moreover, since its grip section 1a is more elastic than metal, it is possible to reduce discomfort when the grip section 1a comes into contact with a tooth of a patient.

Furthermore, when the thermosetting resin of the elastic resin member 6 is silicone resin, the user can grip the dental hand piece 1 with soft feeling to touch and also silicone resin is less slippery and is easily handled. In addition, it is possible to reduce impact when the section made of silicone resin comes into contact with a tooth of a patient or drops.

In addition, when a colored thermosetting resin is used for the elastic resin member 6, it is possible to color the grip section 1a of the dental hand piece 1 with the user's preferred color. It is also possible to color the dental hand piece 1 with different colors depending on its type or with the same color as the main body.

First Modification

Note that the present invention is not limited to the above-described embodiment and various modifications and changes may be made within the technical idea of the present invention, and it goes without saying that the present invention encompasses these modified and changed inventions. Here, the configurations already described above will be given the same symbols and the descriptions will be omitted.

Figure 4:
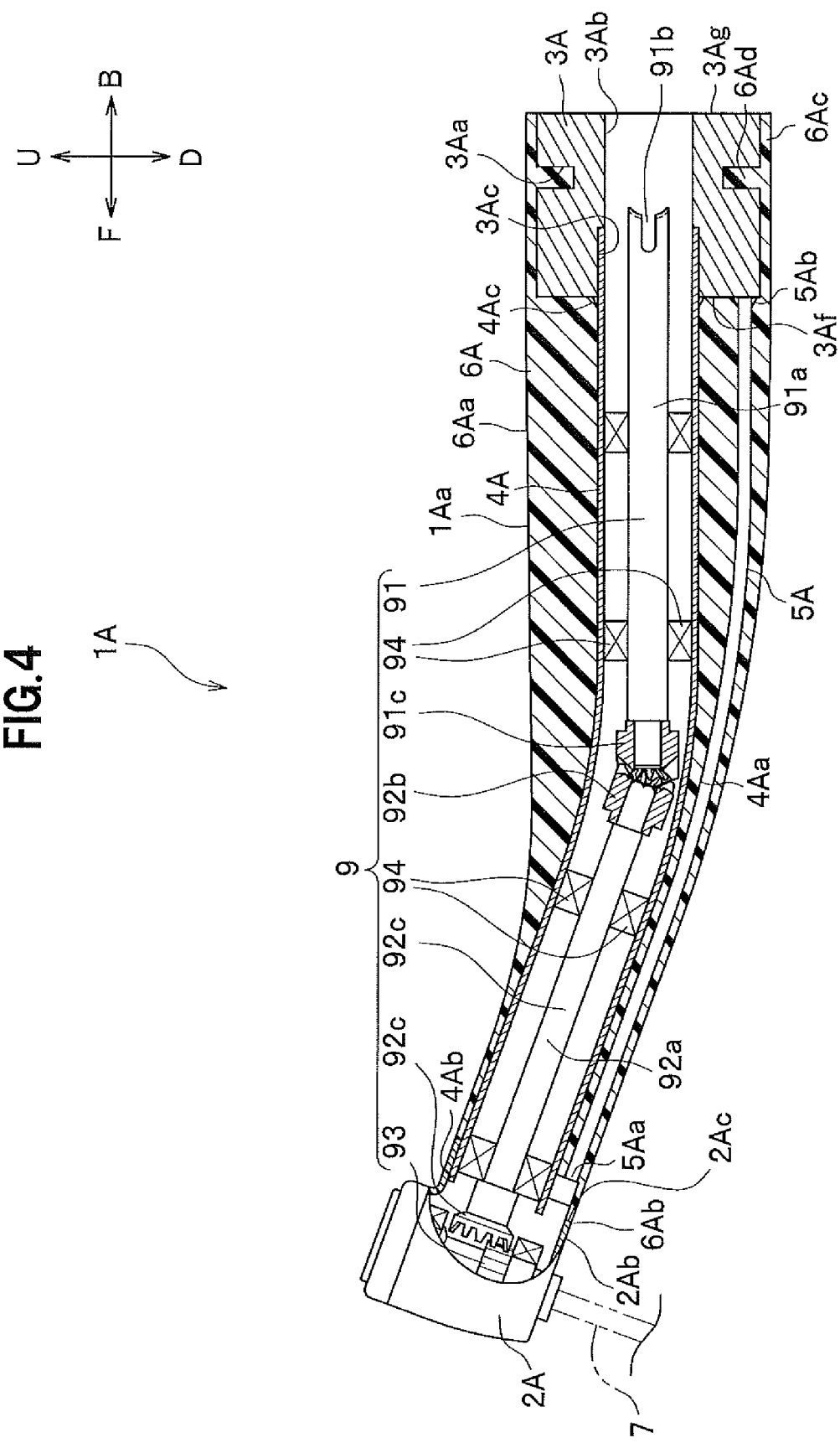
FIG. 4 is a side view having a partial cross-section illustrating First Modification of the dental hand piece according to the embodiment of the present invention.

FIG. 4 is a side view having a partial cross section, illustrating First Modification of the dental hand piece according to the embodiment of the present invention.

Although in the present embodiment, the dental hand piece 1 is described in which the metallic pipes 4, 5 are arranged for supplying or discharging air and liquid and which utilizes the rotor driven by the air as illustrated in FIG. 1, the present invention is not limited to this. For example, like a dental hand piece 1A illustrated in FIG. 4, one in which the cutting tool 7 is driven by an electric motor (not illustrated) is possible.

In this case, the dental hand piece 1A includes: a hand piece head 2A which is provided in a front end section; a connection section 3A which is provided in a rear end section; metallic pipes 4A, 5A through which the hand piece head 2A and the connection section 3A communicate with each other; an elastic resin member 6A which covers a grip section 1Aa; and a gearing mechanism 9 which is provided inside the metallic pipe 4A and driven to rotate by an electric motor (not illustrated).

The gearing mechanism 9 is coupled to a coupling member which is coupled to a rotor shaft of the electric motor (not illustrated) provided outside the dental hand piece 1A. The gearing mechanism 9 is provided inside the metallic pipe 4A and is configured to rotate a rotor gear 93 for driving a cutting tool 7 as the electric motor (not illustrated) is driven to rotate.

The gearing mechanism 9 includes: a first interlocking gearing 91 which is interlocked with the rotor shaft of the electric motor; a second interlocking gearing 92 which is interlocked and rotated with the first interlocking gearing 91; a rotor gear 93 which is rotated by the second interlocking gearing 92; bearing sections 94 which support shaft sections 91a, 92a of the first interlocking gearing 91 and the second interlocking gearing 92.

The first interlocking gearing 91 includes: the shaft section 91a which is formed of a metallic bar-shaped member; a motor coupling section 91b which is formed in a rear end section of the shaft section 91a; and a bevel gear 91c which is provided at a front end of the shaft section 91a. The first interlocking gearing 91 is rotatably supported at the shaft section 91a by the plurality of bearing sections 94 which are provided inside the metallic pipe 4A. The bevel gear 91c and a follower gear 92b which meshes with the bevel gear 91c are provided inside a bent portion 4Aa in a center portion of the metallic pipe 4A.

The second interlocking gearing 92 includes: the shaft section 92a which is formed of a metallic bar-shaped member; the follower gear 92b which is formed in a rear end section of the shaft section 92a; and a front gear 92c which is provided at a front end of the shaft section 92a. The second interlocking gearing 92 is rotatably supported at the shaft section 92a by the plurality of bearing sections 94 which are provided inside the metallic pipe 4A. The follower gear 92b meshes with the bevel gear 91c with the shaft sections 91a, 92a being inclined relative to each other. The front gear 92c meshes with the rotor gear 93 in directions orthogonal to each other.

The rotor gear 93 is a gear which is arranged inside the hand piece head 2A in mesh with the front gear 92c. The rotor gear 93 is interlocked and rotated with the front gear 92c to synchronously rotate the cutting tool 7.

The bearing sections 94 which support the first interlocking gearing 91 and the second interlocking gearing 92 are formed of bearings arranged at appropriate intervals inside the metallic pipe 4A, for example.

The hand piece head 2A is detachably provided with the cutting tool 7 at the lower side like the aforementioned embodiment. The hand piece head 2A is provided with the rotor gear 93 for driving the cutting tool 7 to rotate; and a neck section 2Ab which is coupled with a front end of the grip section 1Aa.

The connection section 3A is provided such that a front end face 3Af and an outer peripheral section are covered with the elastic resin member 6A and a rear end face 3Ag is exposed. The connection section 3A includes: an annular recess section 3Aa which is provided in the outer peripheral surface; a pipe insertion hole 3Ab which is formed to be continuous to an inner surface of the metallic pipe 4A; and a step face 3Ac in which the rear end section of the metallic pipe 4A is fitted.

The recess section 3Aa is a section that allows the resin material which forms the body covering section 6Aa to flow into the recess section 3Aa, firmly fixing the elastic resin member 6A to the connection section 3A, during the molding of the grip section 1Aa.

The step face 3Ac is formed to have an inner diameter increased in conformity with the thickness of the metallic pipe 4A from the inner wall face of the pipe insertion hole 3Ab. The step face 3Ac is formed in the front end section of the pipe insertion hole 3Ab.

The metallic pipe 4A is a pipe in which the first interlocking gearing 91, the second interlocking gearing 92, and the bearing sections 94 are provided. The metallic pipe 4A functions as a frame member in the dental hand piece 1A. The metallic pipe 4A includes: the bent portion 4Aa which is formed to bent in a substantially dogleg shape; a front coupling section 4Ab which is inserted in the neck section 2Ab; and a rear joint section 4Ac which is joined to the front end face 3Af of the connection section 3A by brazing or the like.

The metallic pipe 5A is a pipe for supplying air or a liquid to the hand piece head 2A and is formed smaller in diameter than the metallic pipe 4A. The metallic pipe 5A is provided along the metallic pipe 4A. The metallic pipe 5A includes: a front coupling section 5Aa which is coupled into the neck section 2Ab; and a rear joint section 5Ab which is joined to the front end face 3Af of the connection section 3A by brazing or the like.

The elastic resin member 6A includes: a body covering section 6Aa which forms the grip section 1Aa; a front end section 6Ab which is continuously provided in flush with the neck section 2Ab; a connection section covering section 6Ac which covers the connection section 3A; and a locking section 6Ad which is provided inside the recess section 3Aa.

The elastic resin member 6A is, like the elastic resin member 6 of the aforementioned embodiment, made of a thermosetting resin such as colored silicone resin which is melted and molded into the grip section 1Aa when a wound resin member (not illustrated) having a tape shape (sheet shape) wound around the metallic pipes 4A, 5A is placed inside a mold 8 heated to a high temperature.

As described above, the dental hand piece 1A may be driven by an electric motor.

In addition, the grip section 1Aa of the dental hand piece 1A in the First Modification is provided such that the elastic resin member 6A covers a portion from the rear end of the hand piece head 2A to the front end of the outer peripheral section of the connection section 3A and the locking section 6Ad is filled in the recess section 3Aa of the connection section 3A. When the dental hand piece 1A is formed in this way as well, it is possible to firmly mold the elastic resin member 6A such that the elastic resin member 6A is not displaced from the metallic pipes 4A, 5A.

Second Modification

Figure 5:
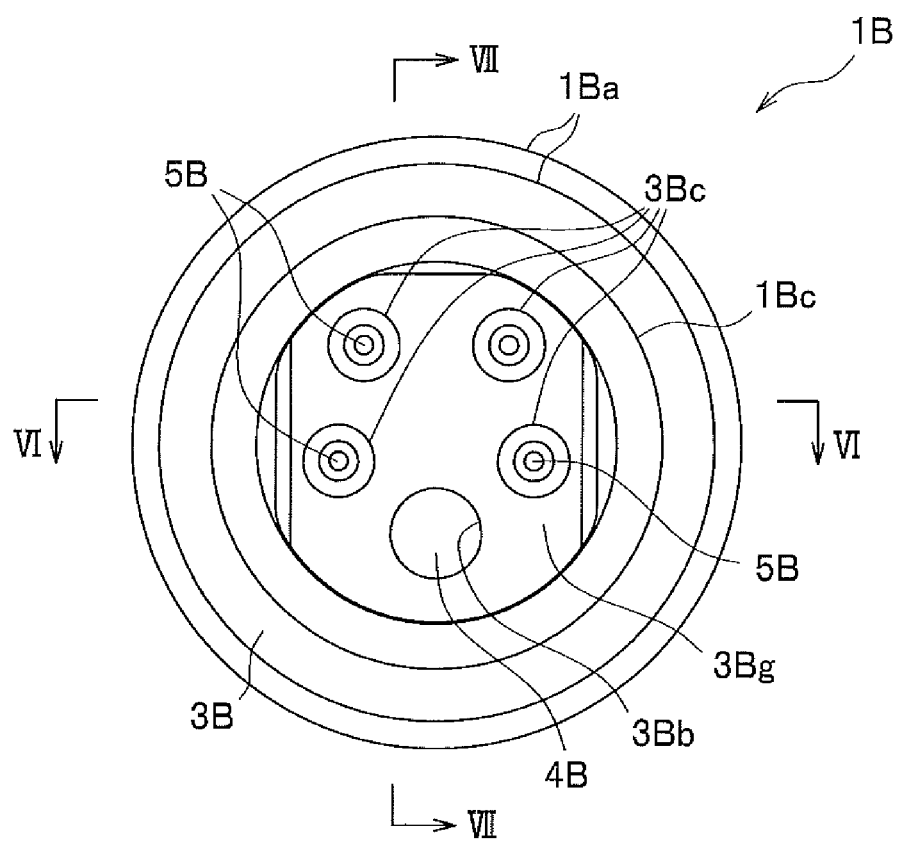
FIG. 5 is an enlarged back view illustrating Second Modification of the dental hand piece according to the embodiment of the present invention.
Figure 6:
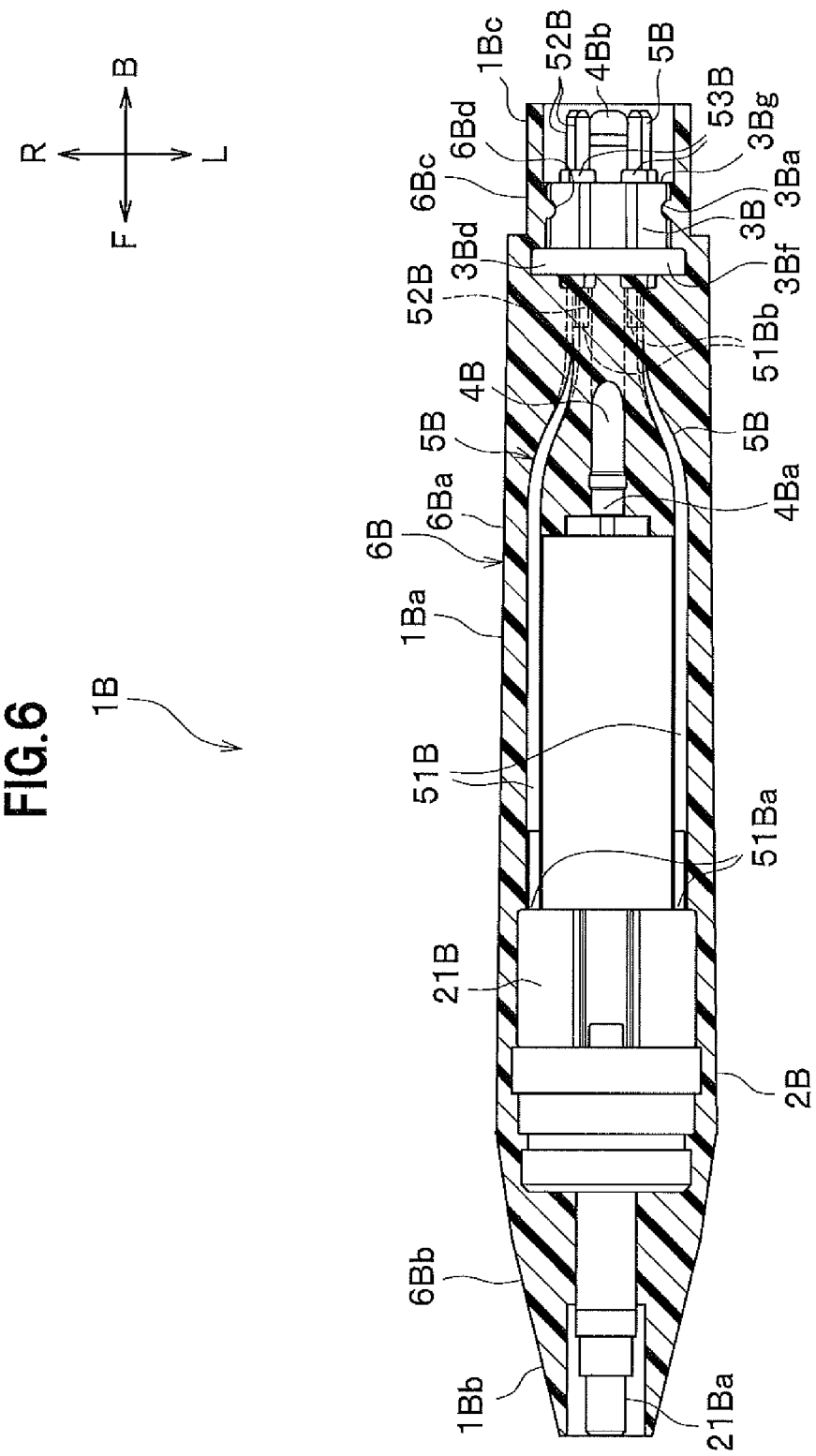
FIG. 6 is a VI-VI cross-sectional view of FIG. 5.
Figure 7:
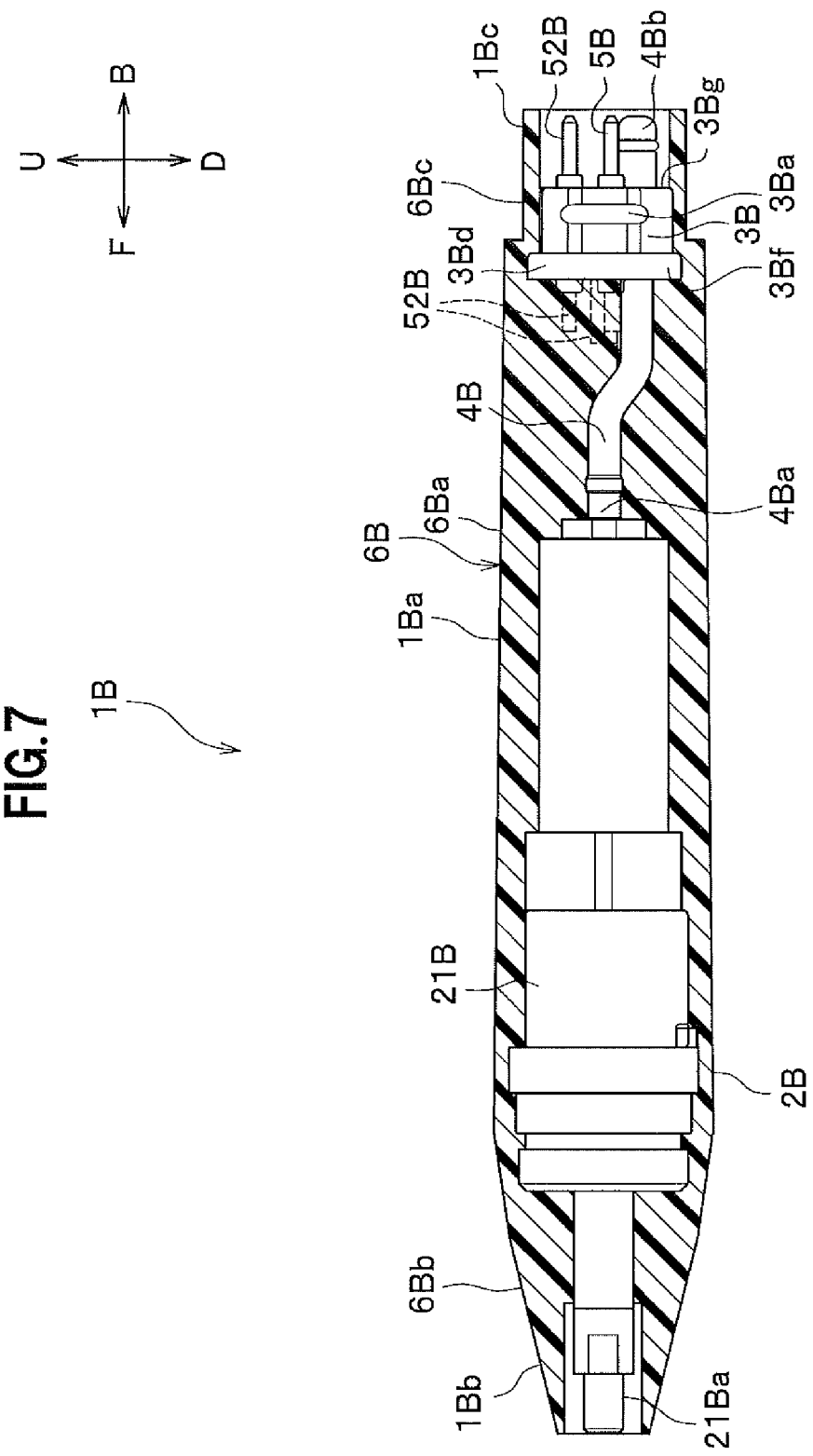
FIG. 7 is a VII-VII cross-sectional view of FIG. 5.

FIG. 5 is an enlarged back view illustrating Second Modification of the dental hand piece according to the embodiment of the present invention. FIG. 6 is a VI-VI cross-sectional view of FIG. 5. FIG. 7 is a VII-VII cross-sectional view of FIG. 5.

In addition, as illustrated in FIG. 5 to FIG. 7, the dental hand piece 1B may be a dental scaler which ultrasonically vibrates a dental tip (not illustrated) provided on a hand piece head 2B with an ultrasonic vibrator 21B.

In this case, the dental hand piece 1B includes: the hand piece head 2B which is provided on a front end side and has the ultrasonic vibrator 21B; a connection section 3B which is provided in a rear end section; metallic pipes 4B, 5B through which the hand piece head 2B and the connection section 3B communicate with each other; an elastic resin member 6B which covers a grip section 1Ba; and the ultrasonic vibrator 21B which is provided inside the metallic pipe 4B and is driven with electric power from an electric wire 51B. This dental hand piece 1B is a device which carries out treatment with a dental tip detachably provided to a front end of the hand piece head 2B for scaling (dental calculus removal) or irrigation (cleaning of a hole formed by grinding a cavity, a periodontal pocket, and the like). The dental hand piece 1B is entirely covered with the elastic resin member 6B except the front end face and the rear end face. The dental hand piece 1B has, on the front end side, a piece attachment section 1Bb to which the hand piece head 2B is attached, and is provided, at the rear end section, with a connector section 1Bc for electric connection.

The hand piece head 2B incorporates the ultrasonic vibrator 21B in which an ultrasonic vibration source (piezoelectric element) and a vibration transmission member (horn) for transmitting vibration generated in the ultrasonic vibration source are coupled.

The ultrasonic vibrator 21B includes, in the front end section, a tip attachment section 21Ba to which dental tips (not illustrated) are interchangeably coupled. To the rear end side of the ultrasonic vibrator 21B, the metallic pipes 4B, 5B are connected, which are entirely provided inside the elastic resin member 6B.

Of the connection section 3B, the front end face 3Bf and the outer peripheral section are covered with the elastic resin member 6B and the rear end face 3Bg forms a recessed wall of the connector section 1Bc. The connection section 3B includes: a recess section 3Ba which is provided in the outer peripheral surface; a pipe insertion hole 3Bb in which the metallic pipe 4B is inserted; and pipe insertion holes 3Bc in which a plurality of metallic pipes 5B are inserted, respectively; and an annular flange section 3Bd which is formed on the outer peripheral section of the front end.

The recess section 3Ba is a section that allows the resin material which forms the body covering section 6Ba to flow into the recess section 3Ba, firmly fixing the elastic resin member 6B to the connection section 3B, during the molding of the grip section 1Ba.

The pipe insertion hole 3Bb is a hole formed in conformity with the outer diameter of a single metallic pipe 4B, for example. The pipe insertion holes 3Bc are four holes formed respectively in conformity with the outer diameters of four metallic pipes 5B, for example.

The flange section 3Bd is, like the recess section 3Ba, a section which is covered with the resin material which forms the body covering section 6Ba, firmly fixing the elastic resin member 6B to the connection section 3B, during the molding of the grip section 1Ba.

The metallic pipe 4B is a pipe for supplying a liquid such as water. The metallic pipe 4B includes one pipe which functions as a frame member in the dental hand piece 1B. The metallic pipe 4B is joined, at a substantially center portion, to the connection section 3B, a front connection section 4Ba in the front end section is connected to the ultrasonic vibrator 21B and a rear connection section 4Bb in the rear end section is provided inside the connector section 1Bc while being projected out.

The metallic pipes 5B are conductors for supplying electric power to the ultrasonic vibrator 21B and include 4 members each having a smaller diameter than the metallic pipe 4B. The metallic pipes 5B are provided on the left and right sides in the upper and lower stages above the metallic pipe 4B. Each of the metallic pipes 5B includes a cable-shaped electric wire 51B and a terminal 52B which is connected to the electric wire 51B.

Each electric wire 51B has a front joint section 51Ba joined to the ultrasonic vibrator 21B and a rear joint section 51Bb joined to the terminal 52B.

The terminal 52B is an electric connection section for connecting to a power source or the like. Each terminal 52B is fixed in a state where the connection section 3B with an insulating member 53B fitted thereon is inserted. The front end side and the rear end side of the terminal 52B are fixed to the connection section 3B while being projected out of the connection section 3B in the forward and backward directions.

The elastic resin member 6B includes: a body covering section 6Ba which forms the grip section 1Ba; a front end section 6Bb which forms a skin portion of the piece attachment section 1Bb; a connection section covering section 6Bc which forms a skin portion of the connector section 1Bc; and a locking section 6Bd which is provided inside the recess section 3Ba.

When the elastic resin member 6B is resin-molded, first, the ultrasonic vibrator 21B and the metallic pipes 4B, 5B and the connection section 3B are coupled and a tape shape (sheet shape) is wound entirely therearound from a front end of the ultrasonic vibrator 21B to near rear ends of the metallic pipes 4B, 5B. The wound resin member (not illustrated) thus wound is made of a colored thermosetting resin such as silicone resin. When provided in the mold 8 which has been heated to a high temperature, the wound resin member is melted and molded into the skin of the dental hand piece 1B.

As described above, the dental hand piece 1B may be an ultrasonic scaler.

In addition, the elastic resin member 6B may be provided not only in the grip section 1Ba of the dental hand piece 1B but also in such a manner as to cover the entire dental hand piece 1B from the front end section to the rear end section of the dental hand piece 1B. When formed in this manner as well, the dental hand piece 1B can be firmly molded such that the elastic resin member 6B is not displaced.

Other Modifications

Moreover, the dental hand piece 1A of First Modification may be configured such that an electric motor is provided inside the hand piece head 2A and lead wires connected to the electric motor are inserted through the metallic pipes 4A, 5A or the lead wires are inserted directly through the elastic resin member 6A.

Further, although the present embodiment was described with an example in which the elastic resin member 6 which forms the grip section 1a was molded by melting a sheet-shaped resin wound around the metallic pipes 4, 5 with the high-temperature mold 8, the elastic resin member 6 may be formed by, what is called, injection resin molding (injection molding).

REFERENCE SIGNS LIST 1, 1A, 1B Dental hand piece
2, 2A, 2B Hand piece head
3, 3A, 3B Connection section
3a Communication hole
3Aa, 3b, 3Ba Recess section
4, 4A, 4B, 5, 5A, 5B Metallic pipe
6, 6A, 6B Elastic resin member
6a, 6Aa, 6Ba Body covering section
6b Sealing section
6c Communicating section

The invention claimed is:

1. A dental hand piece having a hand piece head provided at a front end section thereof and a connection section provided at a rear end section thereof, which is used with the connection section connected to a dental unit, the dental hand piece comprising:
a plurality of metallic pipes attached to the hand piece head and the connection section through which the hand piece head and the connection section fluidly communicate with each other and which provide a frame member to the dental hand piece; and
an elastic resin member molded from a resin material in a tape or sheet shape wound around the hand piece head, the metallic pipes, and the connections section at least from a rear end section of the hand piece head to a front end section of the connection section,
wherein the metallic pipes are embedded within the elastic resin member, with outer peripheral sections thereof in contact with the elastic resin member.

2. The dental hand piece according to claim 1, wherein the connection section is formed of a metallic member,
the metallic pipes are provided in such a manner as to penetrate through the connection section and be projected out of a rear end section of the connection section,
the connection section includes a communication hole which penetrates from the front end section to the rear end section of the connection section,
the elastic resin member includes:
a body covering section which is attached to cover the portion from the rear end section of the hand piece head to the front end section of the connection section;
a sealing section which is attached to cover the rear end section of the connection section; and
a communicating section through which the body covering section and the sealing section communicate with each other, and
the communicating section is arranged inside the communication hole.

3. The dental hand piece according to claim 2, wherein a recess section is formed in an outer peripheral section of the connection section, and the body covering section is arranged and attached inside the recess section.

4. The dental hand piece according to claim 3, wherein the elastic resin member is of a colored thermosetting resin.

5. The dental hand piece according to claim 4, wherein the colored thermosetting resin is silicone resin.

6. The dental hand piece according to claim 2, wherein the elastic resin member is of a colored thermosetting resin.

7. The dental hand piece according to claim 6, wherein the colored thermosetting resin is silicone resin.

8. The dental hand piece according to claim 1, wherein the elastic resin member is of a colored thermosetting resin.

9. The dental hand piece according to claim 8, wherein the colored thermosetting resin is silicone resin.

10. A method for manufacturing a dental hand piece, the dental hand piece having a hand piece head provided in a front end section thereof, a connection section provided in a rear end section thereof, and a plurality of metallic pipes attached to the hand piece head and the connection section through which the hand piece head and the connection section fluidly communicate with each other and which provide a frame member to the dental hand piece, the method comprising:
  winding a resin material in a tape or sheet shape around the hand piece head, the metallic pipes, and the connection section at least from a rear end section of the hand piece head to a front end section of the connection section, to have an unfinished product of the dental hand piece; and
  molding the unfinished product so that the metallic pipes are embedded within an elastic resin member, with outer peripheral sections thereof in contact with the elastic resin member.

11. The method for manufacturing a dental hand piece, according to claim 10, wherein
  the connection section is formed of a metallic member,
  the metallic pipe is provided in such a manner as to penetrate the connection section and be projected out of a rear end section of the connection section,
  the connection section includes a communication hole which penetrates from the front end section to the rear end section of the connection section,
  the elastic resin member molded includes:
    a body covering section which is attached to cover the portion from the rear end section of the hand piece head to the front end section of the connection section;
    a sealing section which is attached to cover the rear end section of the connection section; and
    a communicating section through which the body covering section and the sealing section communicate with each other, and
  the communicating section is arranged inside the communication hole.

* * * * *